(12) United States Patent
Fan (10) Patent No.: US 8,628,269 B2
(45) Date of Patent: Jan. 14, 2014

(54) ROTATING DRIVE SHAFT COUPLING (76) Inventor: Roy Fan, Arcadia, CA (US)

( * ) Notice: Subject to any disclaimer, the term of this patent is extended or adjusted under 35 U.S.C. 154(b) by 380 days.

(21) Appl. No.: 13/224,900

(22) Filed: Sep. 2, 2011

(65) Prior Publication Data

US 2013/0058710 A1 Mar. 7, 2013

(51) Int. Cl.
*B25G 3/00* (2006.01)

(52) U.S. Cl.
USPC .......................................... 403/383; 399/167

(58) Field of Classification Search
USPC ............. 403/359.1, 359.2, 359.3, 359.6, 383
See application file for complete search history.

(56) References Cited

U.S. PATENT DOCUMENTS

| | | | |
|---|---|---|---|
| 1,265,889 A | | 5/1918 | Ecaubert |
| 1,381,805 A | * | 6/1921 | Crewdson .................. 403/359.1 |
| 1,912,412 A | * | 6/1933 | Stubbs .......................... 403/254 |
| 2,567,663 A | | 9/1951 | Deubel |
| 2,634,991 A | | 4/1953 | Stevens |
| 2,667,373 A | | 1/1954 | Holsing |
| 2,813,450 A | | 11/1957 | Dzus |
| 3,013,411 A | | 12/1961 | Wahlmark |
| 3,529,440 A | | 9/1970 | Bauer |
| 3,542,178 A | | 11/1970 | Ripple |
| 3,545,585 A | | 12/1970 | Eaton, Jr. |
| 3,742,656 A | * | 7/1973 | Amos ........................... 451/508 |
| 3,865,500 A | | 2/1975 | Newell |
| 4,046,479 A | | 9/1977 | Paley |
| 4,074,946 A | | 2/1978 | Swearingen |
| 4,288,998 A | | 9/1981 | Schnur et al. |
| 4,454,922 A | * | 6/1984 | Jamison et al. ............... 175/323 |
| 4,684,272 A | | 8/1987 | Watanabe |
| 4,685,823 A | * | 8/1987 | Lopez ......................... 403/359.2 |
| 4,840,259 A | | 6/1989 | Guslits et al. |
| 4,975,743 A | | 12/1990 | Surti |
| 4,975,744 A | | 12/1990 | Ebata et al. |
| 5,165,881 A | * | 11/1992 | Wicen ........................... 418/152 |
| 5,326,114 A | | 7/1994 | Piotrowski |
| 5,903,803 A | | 5/1999 | Kawai et al. |
| 5,926,673 A | * | 7/1999 | Foster et al. .................. 399/167 |
| 5,987,287 A | * | 11/1999 | Huang .......................... 399/265 |
| 6,128,454 A | * | 10/2000 | Kawai et al. ................... 399/116 |

(Continued)

FOREIGN PATENT DOCUMENTS

DE 1806131 A1 10/1969
DE 3111771 A1 10/1982

(Continued)

OTHER PUBLICATIONS

International Search Report and Written Opinion mailed Feb. 1, 2013 in connection with International Appln. No. PCT/US2012/051072.

*Primary Examiner* — Michael P Ferguson
*Assistant Examiner* — Daniel Wiley
(74) *Attorney, Agent, or Firm* — Glenn M. Massina, Esq.; Fox Rothschild LLP (57) ABSTRACT

A rotatable coupling is used with a replaceable developer cartridge and electrostatographic image devices. The coupling has a driven portion and a driving portion. The driven portion has a shaft with a connecting portion that has a plurality of helical involute teeth extending outwardly. The driving portion has an end with a gear shaft and a twisted petaline recess in the gear shaft. The sides of the recess are engageable with the helical involute teeth so that the driving portion drives the driven portion and transmit torque.

17 Claims, 5 Drawing Sheets

(56) References Cited

U.S. PATENT DOCUMENTS

| | | | |
|---|---|---|---|
| 6,163,665 A * | 12/2000 | Watanabe et al. | 399/111 |
| 6,173,146 B1 * | 1/2001 | Wang et al. | 399/265 |
| 6,240,266 B1 * | 5/2001 | Watanabe et al. | 399/117 |
| 6,324,363 B1 | 11/2001 | Watanabe et al. | |
| 6,330,409 B1 * | 12/2001 | Watanabe et al. | 399/111 |
| 6,336,018 B1 | 1/2002 | Kawai et al. | |
| 6,349,188 B1 * | 2/2002 | Kawai et al. | 399/116 |
| 6,400,914 B1 | 6/2002 | Noda et al. | |
| 6,501,926 B1 * | 12/2002 | Watanabe et al. | 399/117 |
| 6,501,927 B1 * | 12/2002 | Watanabe et al. | 399/117 |
| 6,547,479 B2 * | 4/2003 | Dowling et al. | 403/359.2 |
| 6,604,885 B1 * | 8/2003 | Neuner | 403/359.2 |
| 6,684,041 B2 * | 1/2004 | Yokomori et al. | 399/167 |
| 6,768,890 B2 | 7/2004 | Cho et al. | |
| 6,885,838 B2 * | 4/2005 | Kawai et al. | 399/167 |
| 6,892,042 B2 * | 5/2005 | Jang et al. | 399/167 |
| 6,901,229 B2 * | 5/2005 | Nishiuwatoko et al. | 399/167 |
| 6,963,706 B2 * | 11/2005 | Morioka et al. | 399/111 |
| 7,092,658 B2 * | 8/2006 | Yasumoto et al. | 399/167 |
| 7,236,722 B2 | 6/2007 | Portig | |
| 7,248,814 B2 * | 7/2007 | Kawai et al. | 399/111 |
| 7,274,896 B2 | 9/2007 | Kawai et al. | |
| 7,403,733 B2 * | 7/2008 | Watanabe et al. | 399/111 |
| 7,433,631 B2 | 10/2008 | Karz et al. | |
| 7,537,410 B2 * | 5/2009 | Parisi et al. | 403/383 |
| 7,630,661 B2 * | 12/2009 | Noda et al. | 399/67 |
| 7,813,676 B2 * | 10/2010 | Huck et al. | 399/167 |
| 2003/0059233 A1 * | 3/2003 | Jang et al. | 399/167 |
| 2007/0140735 A1 | 6/2007 | Karz et al. | |
| 2008/0056764 A1 | 3/2008 | Chung | |
| 2008/0101858 A1 * | 5/2008 | Parisi et al. | 403/383 |
| 2009/0080936 A1 | 3/2009 | Parisi et al. | |
| 2010/0037719 A1 * | 2/2010 | Tang | 74/421 A |
| 2010/0196047 A1 * | 8/2010 | Jin | 399/111 |
| 2010/0296863 A1 * | 11/2010 | Yang et al. | 403/359.6 |
| 2010/0303503 A1 | 12/2010 | Woo | |

FOREIGN PATENT DOCUMENTS

| | | |
|---|---|---|
| DE | 3511534 A1 | 10/1986 |
| DE | 3708418 A1 | 9/1988 |
| DE | 4117826 A1 | 12/1992 |
| EP | 570691 A1 | 11/1993 |
| EP | 586043 A2 | 3/1994 |
| FR | 2356046 A1 | 1/1978 |
| GB | 2177479 A | 1/1987 |
| JP | 59131485 A | 7/1984 |
| JP | 59228281 A | 12/1984 |
| JP | 6258877 A | 9/1994 |
| JP | 10-153937 A | 6/1998 |

* cited by examiner

ROTATING DRIVE SHAFT COUPLING

FIELD OF THE INVENTION

This invention relates to the field of mechanically transmitting rotational force from a drive mechanism that is coupled to another rotational device. The invention can be used in general situations when a drive shaft is coupled to a driven apparatus. The preferred embodiment of the invention is used in the field of electrostatographic image forming devices such as copiers, facsimile machines, electrophotography printers, and replaceable or changeable cartridges for these devices, such as a toner cartridge for a laser printer.

BACKGROUND OF THE INVENTION

Many electrophotographic machines, such as photocopiers or laser printers, use a detachable developer cylinder that contains a photosensitive member. The cylinder is also known as a cartridge or developer cartridge, and it is detachably mounted to the complete copier or printer. This construction enables users to maintain the printing capability of the device without the aid of a serviceman.

The developer cylinder must be coupled to a drive mechanism that rotates the cartridge. Typically this is accomplished by a driving member with a hole or recess that couples with a projecting end in the driven member, which includes the cartridge. U.S. Pat. No. 5,987,287 to Huang, which is incorporated by reference into this disclosure, is a typical attempt to address the problems of connecting the developer cylinder. FIG. 1 of Huang depicts a typical prior art coupling and is the reference on which the following description is based. The drive coupling includes a drive shaft B that is centered in drive gear A that, in turn, drives developer cylinder E. The end of developer cylinder E has a fixedly mounted a flange that includes a transmission gear F and triangular coupling block D that fits in coupling recess C, which is disposed at the end of drive shaft B. Recess C is a twisted triangular hole, while coupling block D is a twisted triangle that is engageable with recess C. The driven end of the cylinder is typically made of plastic. Although not shown in Huang, many prior art couplings, including those in commercial use, include some form of pin and hole that assist the coaxial alignment of the driving and driven portions of the coupling.

Because the torque on twisted coupling block D of Huang is concentric to its three pointed vertices, the driven cylinder flange with its projection and the driving mechanism both encounter high stresses. An example of this problematic arrangement can be seen in FIG. 18 of U.S. Pat. No. 5,903,803 to Kawai et al. In FIG. 18a a triangular projection fits in a larger triangular recess without the two pieces engaging. FIG. 18b depicts the relative rotation of the two pieces such that they engage where the tips of the smaller triangle meet the flat sides of the larger recess. The relative sizes of the projection and recess, and the lack of precise engagement, occur because replacing the developer cartridge requires some dimensional tolerance. Many existing machines use a triangular or twisted triangular recess as the driving mechanism and some form of triangular driven mechanism.

In an effort to reduce the stress where the driving and driven portions of the coupling engage, some have tried beveling the triangular tips in an attempt to achieve a greater contact area between the triangular tips and the sides of the recess into which it fits. See, e.g., Kawai FIGS. 19a and 19b. Other examples of attempted solutions to the coupling problem can be seen in U.S. Pat. No. 7,433,631 to Karz et al; U.S. Pat. No. 6,768,890 to Cho et al; U.S. Pat. No. 6,173,146 to Wang et al; and, U.S. Patent Appl. No. 2010/0196047 to Jin. Karz uses a triangular recess that engages with three skewed blades mounted on a rod. Cho uses a tapered recess with spiral protrusions that engages with a tapered shaft that has spiral sloping ribs. Wang et al describes a triangular recess coupling with a shaft that has a plurality of teeth spaced spirally around the shaft. Wang has circular spiral teeth, not the more adaptable and effective helical involute teeth of the present invention. Jin emphasizes the tradeoffs between accuracy and wear, highlighting that his invention involves point rather than surface contact. According to Jin, that arrangement—point contact—makes torque transmission more mechanically reliable, which in turn makes the printing more accurate. The point contact, however, hastens the wear of the driving and driven mechanisms because of the stress concentration at the point. Jin is also more likely to damage the recess of the driving mechanism, which affects the coaxial alignment of the driving and driven mechanisms and thus causes the print quality to deteriorate as the coupling wears. If the wear to the recess of the driving mechanism is too great, the driving mechanism could require replacement. This part of the device is much more difficult to remove and repair than simply replacing a plastic cartridge that contains a developer cylinder with ink or toner.

During the life of a device such as a printer or facsimile, the developer cartridge may be replaced many times, depending on the design of the device and the user's printing needs. A successful mechanical coupling must be designed in a way to 1) maximize the torque that can be transferred from the driving mechanism to the driven mechanism and the developer cylinder; 2) maintain the coaxial alignment of the driving and driven mechanism, which also maintains the accuracy of the printing process; 3) minimize the wear on the driving and driven mechanisms, which in turn maintains the accuracy and reduces the maintenance cost of the machine; 4) maintain the coupling's dimensional tolerances to facilitate easy replacement of the cartridge with the developer cylinder; and, 5) render a low manufacture cost. Despite the numerous designs of mechanical couplings, both for devices like photocopiers and facsimiles as well as for other types of mechanical couplings, there remains a need for an improved rotational coupling that will overcome all of these problems.

SUMMARY OF THE INVENTION

The present invention is a substantial improvement to the mechanical coupling, because manufacture and maintenance costs can be reduced without sacrificing printing accuracy. Because the twisted coupling hole or recess is engaged with a plurality of helical involute teeth, the stress transferred from the torque generated between the driving mechanism and the driven mechanism is reduced while the coaxial alignment of the driving and driven portions of the coupling is maintained. As a result, more powerful torque may be transferred with the same size coupling or, alternatively, materials of less strength (and less cost) may be used in fabricating the coupling.

Figure 1:
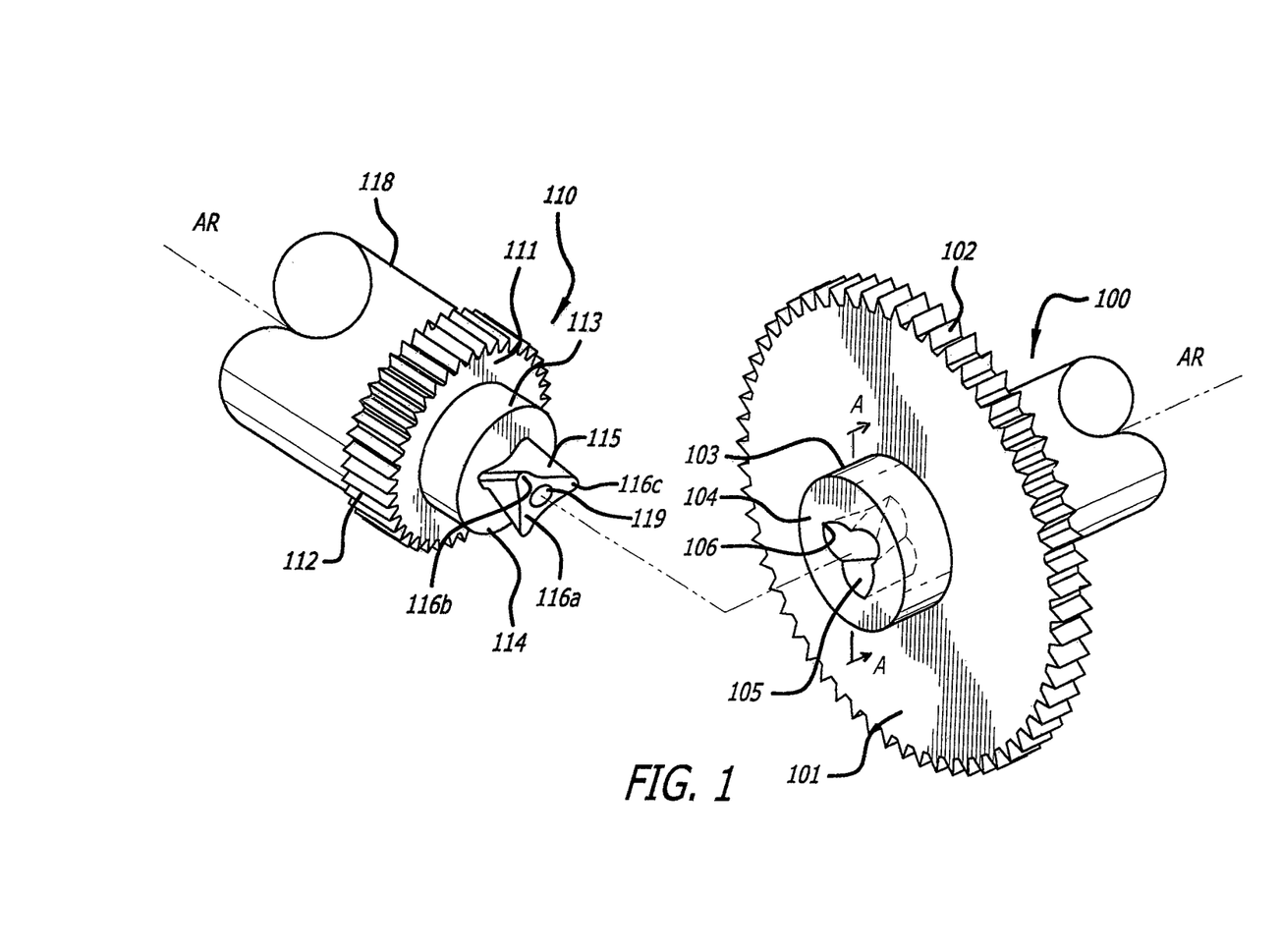
FIG. 1 is a perspective view of the invention's helical involute teeth and recess.
Figure 2:
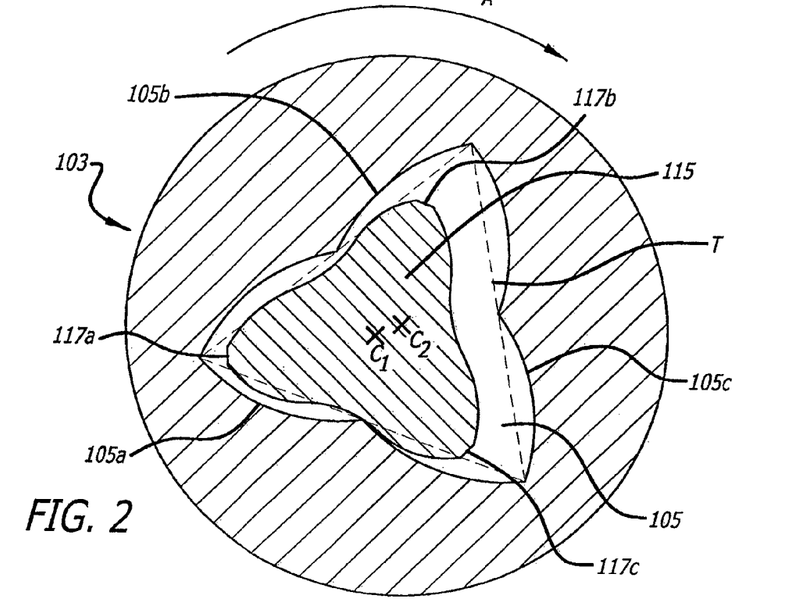
FIG. 2 is a cross-sectional view along the line A-A in FIG. 1 after the projection is inserted into the twisted petaline recess but has not yet engaged with the helical involute teeth.
Figure 3:
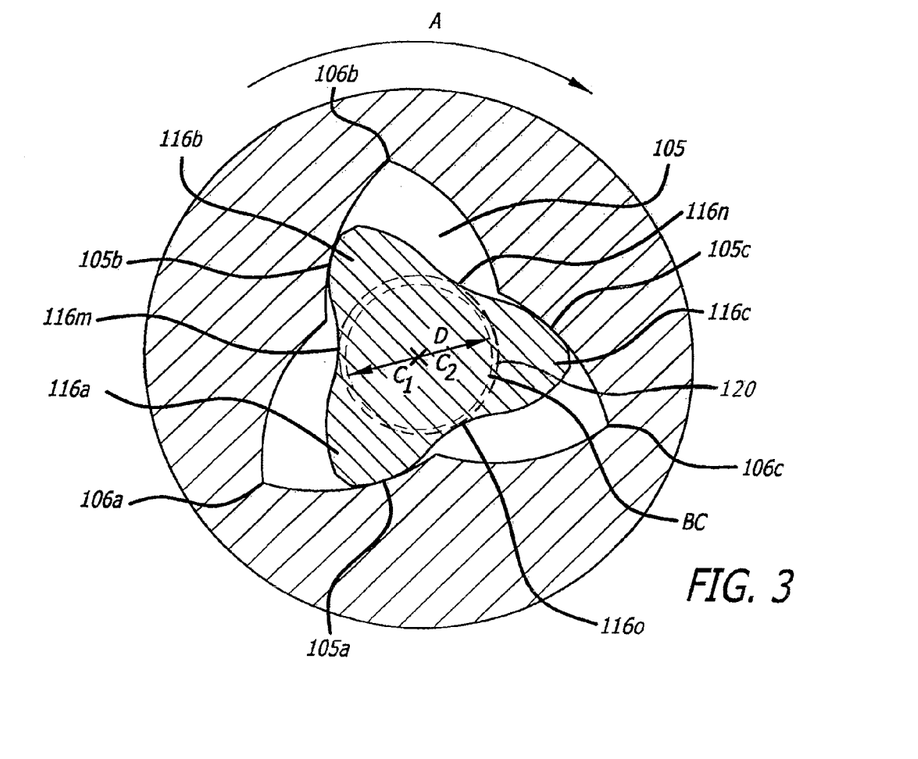
FIG. 3 is a cross-sectional view similar to FIG. 2 with the twisted petaline recess engage with the helical involute teeth.

The invention includes a plurality of helical involute teeth projecting from a cylinder, as shown in FIG. 1. The teeth engage with a twisted, preferably petaline recess or coupling hole in the drive shaft, as shown in FIGS. 2 and 3. The invention permits the involute teeth and petaline recess to engage each other so that a curved surface of the gear and a curved surface of the recess engage in three locations. Moreover, this engagement minimizes the shear stress, maximizes the compression force, and distributes the compression force over a greater surface area on the tooth and on the side of the recess. Greater shear means more wear, less printing accuracy, and a greater chance of failure. In testing, these ends of the developer cylinder have outlasted the prior art coupling ends. This endurance, which results from emphasizing the compression force over the shear and spreading it out over a larger area, ultimately means less part wear, less maintenance cost, and greater printing accuracy.

One embodiment of the invention includes a driving member having an end portion; a driven member having an end portion that is engageable with the driving member; a petaline recess defined by petaline sides and disposed in the end portion of the driving member; a projection disposed on the end portion of the driven member that is coaxially and rotationally engageable with the petaline recess, the projection comprising a plurality of teeth constructed on a base cylinder; and, wherein rotation of the driving member causes the sides of the petaline recess to drivably engage with the teeth.

In a preferred embodiment the diameter of a base circle, defines the shape and the placement of the helical involute teeth, is approximately 0.25 to 0.57 of the side of a triangle defined by vertices in the recess, although the invention is not limited by that ratio. Ratios on the order of ⅙ to ¾, i.e., about 0.16 to 0.75, are acceptable limits of the invention. Preferably, the helix angle, the angle between a helix tooth and the axial line on its cylinder, is approximately 0 to 40 degrees.

In another embodiment, the teeth can be comprised of twisted or helical cycloid curves. Other embodiments are also contemplated, such as three helical involute teeth that are not connected by a center cylinder.

BRIEF DESCRIPTION OF THE DRAWINGS

The objects and advantages of the invention will become apparent to and appreciated by those of skill in the art from the following detailed description of the invention, including the preferred embodiment, in conjunction with the accompanying drawings of which.

DETAILED DESCRIPTION OF THE ILLUSTRATIVE EMBODIMENTS

FIGS. 1-3 depict a preferred embodiment of the present invention. Mounted on the end of developer cylinder 118 is a driven member or driven coupling 110 that is adapted to engage with driving member or driving coupling 100. Drive gear 101 includes a gear shaft 103 at its center and an outside edge 102 having gear teeth. Gear shaft 103 has a front surface 104, which includes a twisted petaline recess 105 having defined vertices 106a, 106b, 106c formed therein. The twisted petaline recess 105 is engageable with the plurality of helical involute teeth 116a, 116b, 116c.

Driven coupling 110 is attached to photosensitive drum 118 of a replaceable or changeable developer cylinder and has geared driven shaft cylinder 112 that includes shaft cylinder flange 111. Concentric shaft 113 extends longitudinally outwardly from shaft cylinder flange 111. Concentric shaft 113 includes a front surface 114 from which extends an engagement projection 115 that has a plurality of helical involute teeth 116 extending radially outward from the centerline of rotation of driven shaft cylinder 112, concentric shaft 113, and engagement projection 115. The plurality of helical involute teeth 116a, 116b, 116c are adapted to fit within twisted petaline recess 105 shown in driving shaft 103 of driving coupling member 100. The helical involute teeth 116 are constructed on a helical petaline cylinder along the axis of rotation AR of the driven coupling 110.

FIG. 2 depicts the initial, non-rotational engagement of the driving and driven couplings 100, 110 shown in FIG. 1. Recess 105 in gear shaft 103 is petaline (or petaloid) shaped, with three petal tips 106a, 106b, 106c. In the preferred embodiment the three petal tips are pointed. The three tips 106 define an equilateral triangle with center C2 and side length T. FIG. 2 also depicts engagement projection 115 that includes three helical involute teeth 116a, 116b, 116c that preferably have flattened tips 117a, 117b, 117c. Engagement projection 115 is preferably symmetrical and has a center C1. In FIG. 2, when engagement projection 115 is not engaged with the sides of recess 105, centers C1 and C2 do not coincide. When driving shaft 103 rotates in the direction of arrow A, the surface areas near or adjacent the flattened tips 117a, 117b, 117c of teeth 116a, 116b, 116c eventually contact the sides 105a, 105b, 105c of recess 105. At this point centers C1 and C2 become concentric, which places driving coupling 100 and driven coupling 110 in coaxial alignment. From this single center there is the Base Circle BC of diameter D, as shown in FIG. 3. The profile of teeth 116a, 116b, 116c is the involute of the Base Circle. The involute curves of teeth 116a, 116b, 116c engage recess 105 at the rounded sides 105a, 105b, 105c. Hole or recess 119 in projection 115 is adapted to receive a pin (not shown) in recess 105 to facilitate co-axial alignment. Various pin-and-hole arrangements are known in the prior art and are currently used in commercial applications.

Figure 7:
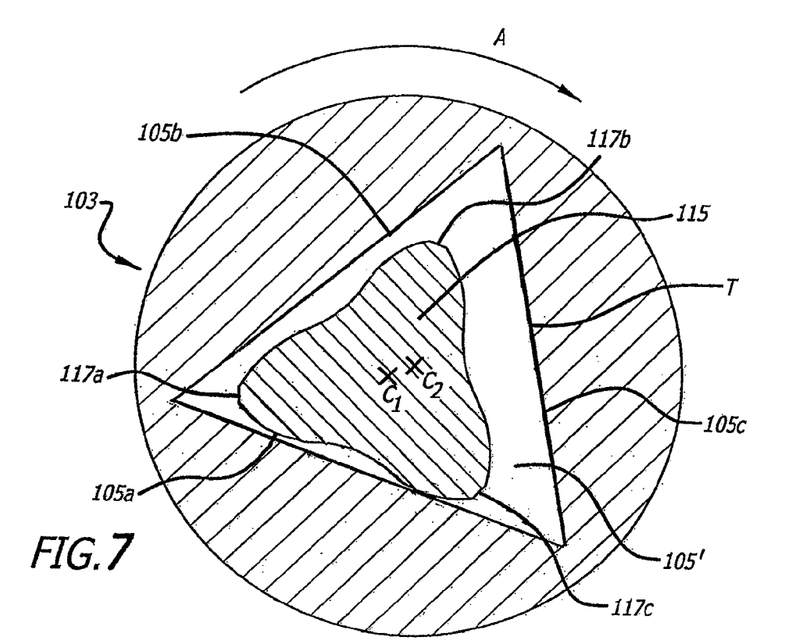
FIG. 7 is a cross-sectional view similar to FIG. 2 illustrating an alternative recess.
Figure 8:
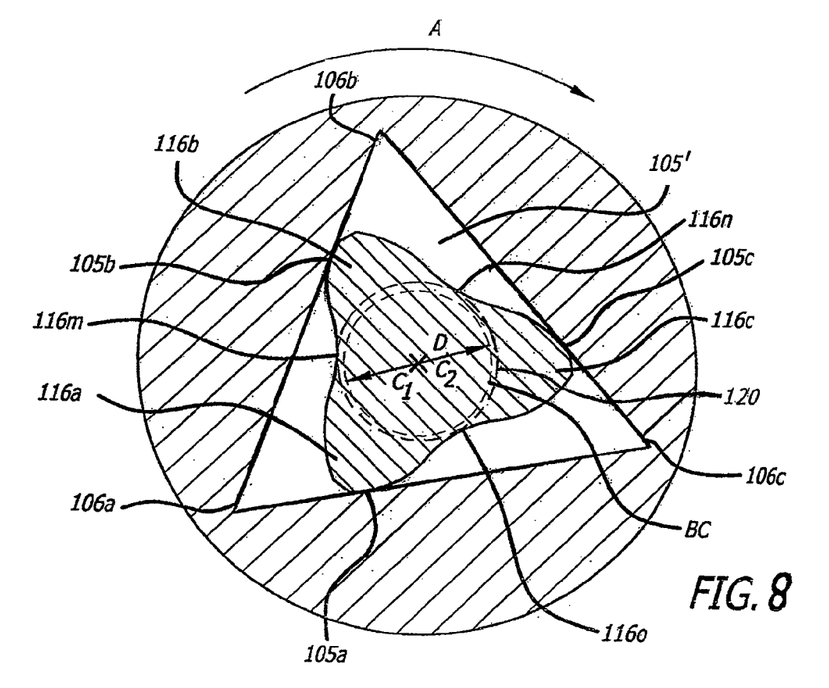
FIG. 8 is a cross-sectional view similar to FIG. 3 illustrating the alternative recess of FIG. 7.

As noted above, the invention's configuration distributes the shear and compressive forces far better than if the teeth were simply a twisted triangle or circular segments like those of Wang et al. The projection 115 has larger surface areas that contact with recess 105 and in turn permit any compressive force to be distributed over more area, thus lessening the stress. A greater area also improves the frictional engagement that develops from the shear stresses. Experience with the invention has established a preferable range for diameter D: approximately 0.25 to 0.57 of the length of side T of the inscribed triangle of recess 105 shown in FIG. 2. A larger range, on the order of 0.16 to 0.75, can be used. As D increases the involute curve becomes flatter, so that a more powerful torque can be transmitted. At the same time, however, the tolerance for reinstalling the replaceable developer cylinder decreases. Similarly, as D decreases the tolerance for reinstallation increases, but the radius of curvature of the involute curve of the teeth decreases, decreasing the amount of torque that can be transmitted through the coupling and increasing the shear stress in the coupling. Nevertheless, testing of the invention has demonstrated that it is a significant improvement over the prior art. Even when the helical involute teeth are used with a typical prior art triangular recess 105' as shown in FIGS. 7 and 8, the performance of the torque driving mechanism is significantly improved. In a triangular prior art recess the radius of curvature of each side T of the recess 105' is infinity, because each side of the recess 105' is flat. Nevertheless, the flatness of the involute curve on the side of the teeth 116a,116b,116c (i.e., a greater radius of curvature of the side of the tooth) enables greater stability, because there is a greater surface area of engagement between each tooth surface and the surface of the recess 105'. As a result, the coupling can substantially increase the torque transmission from the driving to the driven mechanism. Alternatively, if greater torque is not necessary, the torque of the driving mechanism can be reduced, which results in less stress, longer part life, continued precise coaxial alignment, and printing accuracy.

As those of skill in the art will understand, the configuration of a helical involute tooth depends on several parameters, including the helix angle of the tooth and the radius of the base cylinder to which the tooth is attached. The preferable range for the helix angle of the tooth is approximately 15 to 30 degrees. The helix angle is measured between a helix tooth and the axial line on the base cylinder of the tooth. It should be emphasized that the radius of base circle BC is ordinarily not the same as the radius of the base cylinder 120 of the helical involute tooth. For example, in FIG. 3 diameter D of the base circle BC is less than the diameter of the base cylinder 120 to which teeth 116a, 116b, 116c is attached. In FIG. 3, the base cylinder 120 has center C1 and the edge of the base cylinder 120 is a circle defined by points 116m, 116n, 116o.

The preceding description represents a preferred embodiment of the invention. Nevertheless, all modifications and variations to the invention claimed below, whether specified or not, should be considered within the scope of the claims. For example, the coupling should not be limited in use to electrophotographic, xerographic, or other copying, printing, and document production devices. It could, for example, find use in the automobile industry, in which splined shaft and sleeve couplings have been used in transmissions. The petaline projection may be part of a conical or cylindrical structure. Depending on how the coupling is used, the drive mechanism and driven mechanism could switch functions. In other words, drive coupling 100 and driven coupling 110 would retain the same or similar structure, but drive coupling 100 would be the driven coupling and driven coupling 110 would become the drive coupling Likewise, diameter D should not be limited to the preferred range. Depending upon its application, the invention may require, say, larger forces for which smaller tolerances are a necessary consequence.

Figure 4:
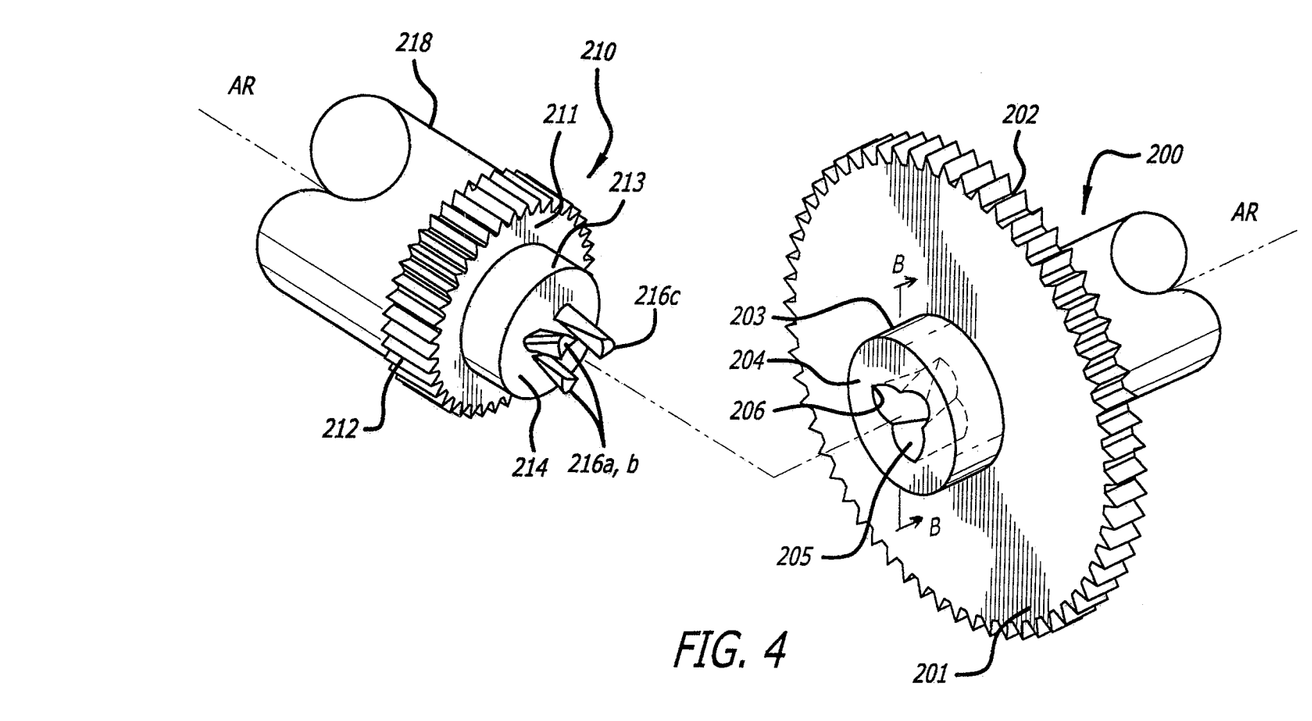
FIG. 4 is a perspective view of another embodiment of the twisted involute coupling in which the helical involute teeth are not connected to a center cylinder.
Figure 5:
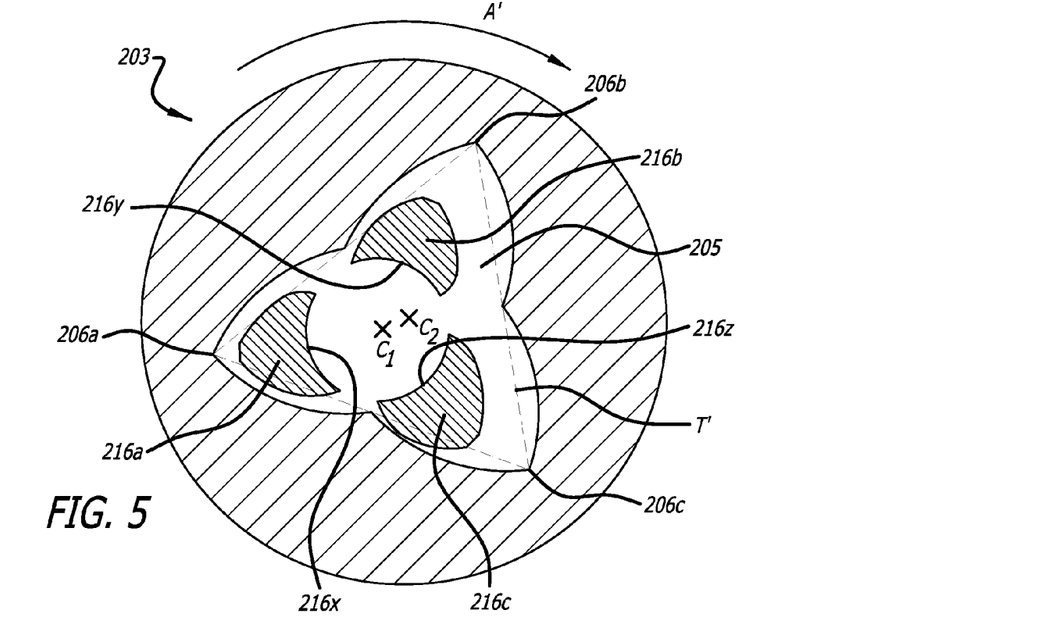
FIG. 5 is a cross-sectional view of along the line B-B in FIG. 4 after the projection is inserted into the recess but is not yet engaged with the helical involute teeth.
Figure 6:
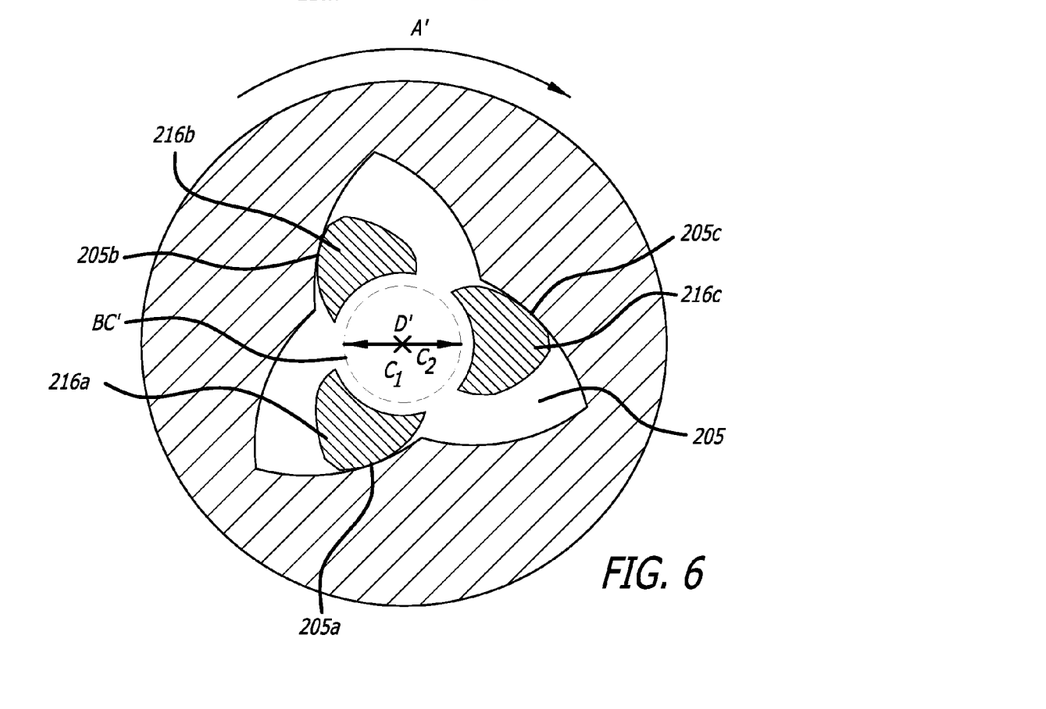
FIG. 6 is a cross-sectional view in which the recess is engaged with the helical involute teeth.

Although the preceding description is the preferred embodiment, it is possible to implement the invention by using only the unconnected helical involute teeth. As noted above, these teeth can be used to engage a triangular or twisted triangular recess. That way the helical involute teeth can function with prior art recesses in the driving mechanism of existing printing devices that are still in use. As the preferred petaline recess becomes commercially implemented with the helical involute teeth, the mechanical life of the both the driving and driven portions of the coupling will continue to improve. For example, FIGS. 4-6 depict an alternate embodiment, with the numerals generally corresponding to the numerals in FIGS. 1-3. When engaged, as depicted in FIG. 6, driving member 200 in FIG. 4 couples with and rotates driven member 210, which is attached to developer cylinder 218. The rotation in the direction of arrow A' causes the helical involute profiles of teeth 216a, 216b, 216c of the driven member 210 to engage with the sides 205a, 205b, 205c defining recess 205. As depicted in FIGS. 4-6, teeth 216a, 216b, 216c are separate structures, whereas in FIGS. 1-3 teeth 116a, 116b, 116c are part of a unitary helical involute projection 115 that has a cylindrical center. In FIGS. 5-6, a cylinder of material has been removed from the projection. It should be noted that it is unnecessary for sides 216x, 216y, 216z to be circular arcs. The sides could be flat. In an embodiment such as the one in FIGS. 4-6, circle BC' with diameter D' can be an imaginary construct that facilitates designing the relationship between teeth 216a,b,c and recess 205. Similarly, the petaline recess 205 could be designed to that tips 206a, 206b, 206c, which define triangle T', exist inside the empty space of recess 205 or within the material of gear shaft 203.

Those of skill in the art will also understand that there can be variations in the terminology used to describe the invention. For example, in FIG. 2 the three petals are depicted as part of the projection 115. In FIG. 3 the three petals are depicted as separate teeth 116a, 116b, 116c. Some in the art would refer to projection as a single helical involute gear or a portion of such gear. Other uses and variations of the invention will become apparent to those skilled in the art. Therefore, it is intended that the invention not be limited to the particular embodiments or uses described here, but that the invention will include all embodiments falling within the scope of the claims.

What is claimed is:

1. A drive coupling for transferring a rotational force, comprising:
    a first member having an end portion;
    a second member having an end portion that is engageable with the first member;
    a helical, cross-sectionally petaline recess defined in the end portion of the first member, the petaline recess having a recess axis and including a plurality of interconnected petal shaped recess portions disposed readially about the recess axis, each petal shaped recess portion including substantially convex, arcuate sides interconnecting at a petal tip with the sides of adjacent recess portions meeting at a common edge;
    a projection disposed on the end portion of the second member that is coaxially and rotationally engageable with the petaline recess, the projection including a base cylinder, said base cylinder comprising a plurality of helical teeth extending radially about a projection axis, wherein the teeth are defined by substantially convex, arcuate sides, the teeth further including a tip having flattened edges;
    wherein one of the first or second members is a driving member and the other is a driven member such that rotation of the driving member causes engagement between each tooth and a respective petaline side whereby the recess axis and the projection axis become coaxial and the driven member is driven, and
    wherein a radius of each tooth as measured from a center of the projection to the tip of the tooth is substantially less than the radius of each petal tip as measured from a center of the recess such that the position of the center of the projection relative to the center of the recess is radially adjustable.

2. The drive coupling of claim 1, wherein the projection has a base circle with a diameter and straight lines between adjacent petal tips define a regular polygon.

3. The drive coupling of claim 2, wherein each tooth has a profile defined by an involute curve which is a function of the base circle diameter.

4. The drive coupling of claim 3, wherein the diameter of the base circle is about 0.25 to 0.57 of the length of a side of the regular polygon.

5. The drive coupling of claim 3, wherein the diameter of the base circle is about 0.16 to 0.75 of the length of a side of the regular polygon.

6. The drive coupling of claim 1, wherein the petaline recess has symmetrically three petal shaped recess portions.

7. The drive coupling of claim 6, wherein the projection comprises three teeth.

8. The drive coupling of claim 7, wherein a profile of each tooth is defined by an involute curve.

9. The drive coupling of claim 7, wherein the teeth are shaped based on a cycloid curve.

10. The drive coupling of claim 1, wherein the projection comprises a plurality of symmetrical, helical involute teeth.

11. The drive coupling of claim 10, wherein the petaline recess is symmetrical and helical and comprises the same number of petal recess portions as the number of teeth on the projection.

12. The drive coupling of claim 11, wherein the teeth are each at a tooth helix angle relative to the projection axis and the petal recess portions are each at a recess helix angle relative to the recess axis, and wherein the tooth helix angle and the recess helix angle are equal.

13. The drive coupling of claim 12, wherein the tooth and recess helix angles are about 15 to 30 degrees.

14. The drive coupling of claim 12, wherein the tooth and recess helix angles are between 0 (zero) and 40 degrees.

15. The drive coupling of claim 1, wherein the first member is the driving member and the second member is the driven member.

16. The drive coupling of claim 1, wherein the first member is the driven member and the second member is the driving member.

17. The drive coupling of claim 1, wherein the maximum radius of each tooth is approximately 75% or less than the radius of each petal tip.

* * * * *